United States Patent
Ayer et al.

(10) Patent No.: US 7,402,277 B2
(45) Date of Patent: Jul. 22, 2008

(54) METHOD OF FORMING METAL FOAMS BY COLD SPRAY TECHNIQUE

(75) Inventors: Raghavan Ayer, Bernards Township, NJ (US); Norman Pokutylowicz, Hillsborough, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 79 days.

(21) Appl. No.: 11/348,590

(22) Filed: Feb. 7, 2006

(65) Prior Publication Data

US 2007/0183919 A1    Aug. 9, 2007

(51) Int. Cl.
*B22F 7/04* (2006.01)
*B05D 1/02* (2006.01)

(52) U.S. Cl. ............... 419/2; 419/9; 427/191; 427/192; 427/247

(58) Field of Classification Search ............ 419/2, 419/8, 9; 427/191, 192, 247
See application file for complete search history.

(56) References Cited

U.S. PATENT DOCUMENTS

| | | | |
|---|---|---|---|
| 1,734,209 A | | 11/1929 | Huffinc |
| 3,344,092 A | * | 9/1967 | Pavuk .................... 521/79 |
| 3,886,981 A | * | 6/1975 | Eliason ................. 138/149 |
| 3,989,651 A | | 11/1976 | Lockwood et al. |
| 4,505,722 A | | 3/1985 | Shelton, Jr. |
| 4,808,558 A | | 2/1989 | Park et al. |
| 5,302,414 A | * | 4/1994 | Alkhimov et al. ......... 427/192 |
| 6,254,938 B1 | | 7/2001 | Pranevicius et al. |
| 6,408,928 B1 | * | 6/2002 | Heinrich et al. ........... 164/46 |
| 6,464,933 B1 | * | 10/2002 | Popoola et al. ............ 419/2 |
| 6,602,545 B1 | * | 8/2003 | Shaikh et al. ............. 427/191 |
| 6,794,059 B2 | | 9/2004 | Shanker |
| 2004/0012110 A1 | | 1/2004 | Grader et al. |
| 2004/0197593 A1 | | 10/2004 | Chellappa |
| 2005/0109616 A1 | | 5/2005 | Ohta et al. |
| 2005/0109617 A1 | | 5/2005 | Ono et al. |
| 2006/0045785 A1 | * | 3/2006 | Hu et al. ................... 419/5 |
| 2006/0133947 A1 | * | 6/2006 | DeBiccari et al. ........... 419/8 |

FOREIGN PATENT DOCUMENTS

| | | |
|---|---|---|
| DE | 101 60 332 A1 | 6/2003 |
| DE | 102 41 511 A1 | 3/2004 |
| EP | 1 500 450 A1 | 1/2005 |
| EP | 1500450 A1 | 1/2005 |
| JP | 2003003247 | 6/2001 |
| JP | 2003003247 A | 1/2003 |

* cited by examiner

*Primary Examiner*—Roy King
*Assistant Examiner*—Ngoclan T Mai
(74) *Attorney, Agent, or Firm*—Robert A. Migliorini

(57) ABSTRACT

The present invention relates to a method of forming metallic foams using cold spray processing. The method allows for the formation of metallic foams on existing substrates as a layer. The method includes the steps of providing a substrate for coating of a metallic foam; cold spraying a mixture of metal particles and a foaming agent onto the substrate to form a substrate coated with an unexpanded metallic layer; foam heat treating the substrate coated with an unexpanded metallic layer at a temperature above the decomposition temperature of the foaming agent for a time sufficient to form a heated substrate coated with an expanded metal foam layer; and cooling the heated substrate coated with an expanded metal foam layer to about ambient temperature to form a cooled substrate coated with an expanded metal foam layer. The method of forming metallic foams on substrates finds application in the oil, gas, and chemical industry by being an integral part of casings, pipelines, transfer lines, and other flow lines.

28 Claims, 15 Drawing Sheets

Expansion behavior of aluminium/TiH$_2$ compacts when foamed at 750 °C.
PRIOR ART Process Schematic of using the Cold Spray process to incorporate metallic foams as part of existing structural components.

PROCESS SCHEMATIC OF COLD SPRAY PROCESS

Photograph of the top view of an aluminum substrate with an Al-2% TiH$_2$ coating Illustrative graphs of consolidation (top) and foaming thermal cycle (bottom).

PHOTOGRAPH OF AL-2% TIH₂ COATED SAMPLE PRIOR (A) AND AFTER (B) HEAT TREATMENT (A)                                                       (B)

Optical Micrographs of Al-2% TiH$_2$ sample #1

SEM of sample near interface of unexpanded Al - 2%TiH$_2$ cold-sprayed coating.

SEM of sample near interface of unexpanded Al - 2%TiH$_2$ cold-sprayed coating at higher magnification 10x magnification cross-section SEM of sample #1 with expanded Al - 2%TiH$_2$ cold-sprayed coating 20x magnification cross-section SEM of sample #1 with expanded Al - 2%TiH$_2$ cold-sprayed coating 50x magnification cross-section SEM of sample #1 with expanded Al - 2%TiH$_2$ cold-sprayed coating 100x magnification cross-section SEM of sample #1 with expanded Al - 2%TiH$_2$ cold-sprayed coating 500x magnification cross-section SEM of sample #1 with expanded Al - 2%TiH$_2$ cold-sprayed coating 1000x magnification cross-section SEM of sample #1 with expanded Al - 2%TiH$_2$ cold-sprayed coating

# METHOD OF FORMING METAL FOAMS BY COLD SPRAY TECHNIQUE

FIELD OF THE INVENTION

The present invention relates to the field of forming metallic foams. It more particularly relates to an improved method for metal foam synthesis. Still more particularly, the present invention relates to improved method of forming metallic foams on preexisting surfaces using cold spray processing.

BACKGROUND

Foams and other highly porous materials with a cellular structure are known to have many interesting combinations of physical and mechanical properties, such as high stiffness in conjunction with very low specific weight or high gas permeability combined with high thermal conductivity. Among man-made cellular materials, polymeric foams are currently the most important ones with widespread applications in nearly every sector of technology. Metals and alloys may also be produced as cellular materials or foams.

There are many ways to manufacture cellular metallic materials. Some methods are similar to techniques used for foaming aqueous or polymer liquids, whereas others are specially designed by taking advantage of characteristic properties of metals such as their sintering activity or the fact that they can be electrically deposited. The various methods can be classified according to the state in which the metal is processed. The four "families" of processes are as follows: (i) from liquid metal, (ii) from solid metal in powdered form, (iii) from metal vapor or gaseous metallic compounds, and (iv) from a metal ion solution.

Power metallurgy is a method of forming conventional closed cell foams where the starting materials are metal powders and where the actual foaming takes place in the liquid state. The production process begins with the mixing of metal powders, which can be made up of elementary metal powders, alloy powders or metal powder blends in the presence of a blowing or foaming agent. Afterwards the mix is compacted to yield a dense, semi-finished product. In principle, the compaction can be done by any technique that ensures that the blowing agent is embedded into the metal matrix without any notable residual open porosity. Examples of such compaction methods are hot uniaxial or isostatic compression, rod extrusion or powder rolling. Which compaction method is chosen depends on the required shape of the precursor material. Rectangular profiles with various cross-sections may be made, from which thin sheets can then be formed by rolling. The manufacture of the precursor has to be carried out carefully because any residual porosity or other defects may lead to poor results in further processing.

Heat treatment at temperatures near the melting point of the matrix material is the next step in the powder metallurgy process. The blowing or foaming agent, which is homogeneously distributed within the dense metallic matrix, decomposes at these temperatures. The released gas forces the compacted precursor material to expand, thus forming its highly porous structure.

FIG. 1 shows expansion curves of an aluminum/$TiH_2$ powder compact when foamed at 750° C. The volume of the expanding foam is shown as a function of time together along with some morphologies in various stages of expansion (including the unexpanded precursor which is 9 mm in height and 32 mm in diameter). An expansion maximum is shown which corresponds to a fairly uniform foam morphology, after which the foam collapses. The degree of maximum expansion, and therefore, the density of the solid metal foam, can be controlled by adjusting the content of the blowing agent and several other foaming parameters, such as temperature and heating rates.

The method is not restricted to aluminum and its alloys. Tin, zinc, brass, lead, gold and some other metals and alloys can also be foamed by choosing appropriate blowing agents and process parameters. The most common alloys for foaming are pure aluminum or wrought alloys. Casting alloys such as $AlSi_7Mg$ (A356) and $AlSi_{12}$ are also frequently used because of their low melting point and good foaming properties.

U.S. Pat. No. 5,302,414 to Alkhimov et al., herein incorporated by reference in its entirety, discloses a cold gas-dynamic spraying method for applying a coating to an article by introducing into a gas, particles of a powder of a metal, alloy, polymer or mechanical mixture of a metal and an alloy. The gas and particles are formed into a supersonic jet having a temperature considerably below a fusing temperature of the powder material and a velocity of from about 300 to about 1,200 m/sec. The jet is then directed against an article of a metal, alloy or dielectric, thereby coating the article with the particles.

U.S. Pat. No. 6,408,928 to Heinrich et al., herein incorporated by reference in its entirety, discloses an apparatus for producing expandable metal, comprising (1) means for feeding a powder mixture containing at least one metal powder and at least one blowing agent in powder form; (2) means for producing a compact body from the powder mixture; and (3) means for heating the compact body to a temperature equal to or above the breakdown temperature of the blowing agent. The cold-gas spray apparatus can be used to form metal foams obtained from the foamable metal bodies.

U.S. Pat. No. 6,464,933 to Popoola et al., herein incorporated by reference in its entirety, discloses a method of fabricating a foamed metal structure using a supply of metal particles. The method comprises the steps of (a) introducing a supply of powder metal particles and foaming agent particles into a propellant gas to form a gas/particle mixture; (b) projecting the mixture at or above a critical velocity of at least sonic velocity onto a metallic substrate to create a deposit of pressure-compacted metal particles containing the admixed foaming agent; and (c) subjecting at least the coating on said substrate to a thermal excursion effective to activate expansion of the foaming agent while softening the metal particles for plastic deformation under the influence of the expanding gases.

A need exists for an improved method to form a metallic foam where the powder metallurgy steps of mixing and compaction are eliminated. A need also exists for a method to form a surface layer of a metallic foam structure on preexisting surfaces.

SUMMARY OF THE INVENTION

It has been discovered that it is possible to form a layer of a metallic foam onto an existing structure with the use of cold spray technique to deposit the layer onto the substrate.

According to the present disclosure, an advantageous method of forming a metallic foam layer on a substrate surface, which includes the steps of providing a substrate for coating of a metallic foam; cold spraying a mixture of metal particles and a foaming agent onto the substrate to form a substrate coated with an unexpanded metallic layer; foam heat treating the substrate coated with an unexpanded metallic layer at a temperature above the decomposition temperature of the foaming agent for a time sufficient to form a heated substrate coated with an expanded metal foam layer; and cooling the heated substrate coated with an expanded metal foam layer to about ambient temperature to form a cooled substrate coated with an expanded metal foam layer.

A further aspect of the present disclosure relates to an advantageous method of forming a metallic foam layer on a substrate surface, which includes the steps of providing a ferrous substrate for coating of a metallic foam; cold spraying a mixture of ferrous particles and a foaming agent onto the substrate to form a ferrous substrate coated with an unexpanded ferrous layer; foam heat treating the ferrous substrate coated with an unexpanded ferrous layer at a temperature above the decomposition temperature of the foaming agent for a time sufficient to form a heated ferrous substrate coated with an expanded ferrous foam layer; and cooling the heated ferrous substrate coated with an expanded ferrous foam layer to about ambient temperature to form a cooled ferrous substrate coated with an expanded ferrous foam layer.

Numerous advantages result from the advantageous method of forming a metallic foam layer on a substrate surface disclosed herein and the uses/applications therefore.

For example, in exemplary embodiments of the present disclosure, the disclosed method of forming a metallic foam layer on a substrate surface provides for collapse/buckling resistance, thermal management and mechanical and acoustic damping resistance.

In a further exemplary embodiment of the present disclosure, the disclosed method of forming a metallic foam layer on a substrate surface permits for the use of metal foams in the oil, gas, and chemical industry by being an integral part of exploration, refining and chemical process equipment. More particularly, the exploration, refining and chemical process equipment includes, but is not limited to, casings, pipelines, transfer lines and other flow lines.

In a further exemplary embodiment of the present disclosure, the disclosed method of forming a metallic foam layer on a substrate surface is done by a cold spray technique.

These and other advantages, features and attributes of the disclosed method of forming a metallic foam layer on a substrate surface of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

The present invention relates to a method of forming a metallic foam layer on a substrate surface. "Foam" is defined as a uniform dispersion of a gaseous phase in either a liquid or a solid. The single gas inclusions are separated from each other by portions of the liquid or solid, respectively. Thus, the cells may be entirely enclosed by the liquid or solid and are not interconnected, which is referred to as a closed cell foam. Alternatively, the cells may not be entirely enclosed by the liquid or solid and are interconnected, which is referred to as a open cell foam. The term "foam" in its original sense was reserved for a dispersion of gas bubbles in a liquid. The morphology of such foams, however, can be preserved by letting the liquid solidify, thus obtaining what is called a "solid foam." "Metallic foams" are generally referred to as solid foams. The liquid metallic foam is merely a stage that occurs during the fabrication of the material. Solid foams are a special case of what is more commonly called a "cellular solid." As in a liquid, the minimization of surface energy only allows for certain foam morphologies, the solid foam, which is just an image of its liquid counterpart, is restricted in the same way. In contrast, cellular solids are not necessarily made from the liquid state, and can therefore have nearly any morphology, e.g. the typical open structure of sintered powders. Often such porous structures are also named "foams" although the term "sponge" is likely more appropriate. Metallic foams may have an open cell or closed cell type of structure.

Figure 1:
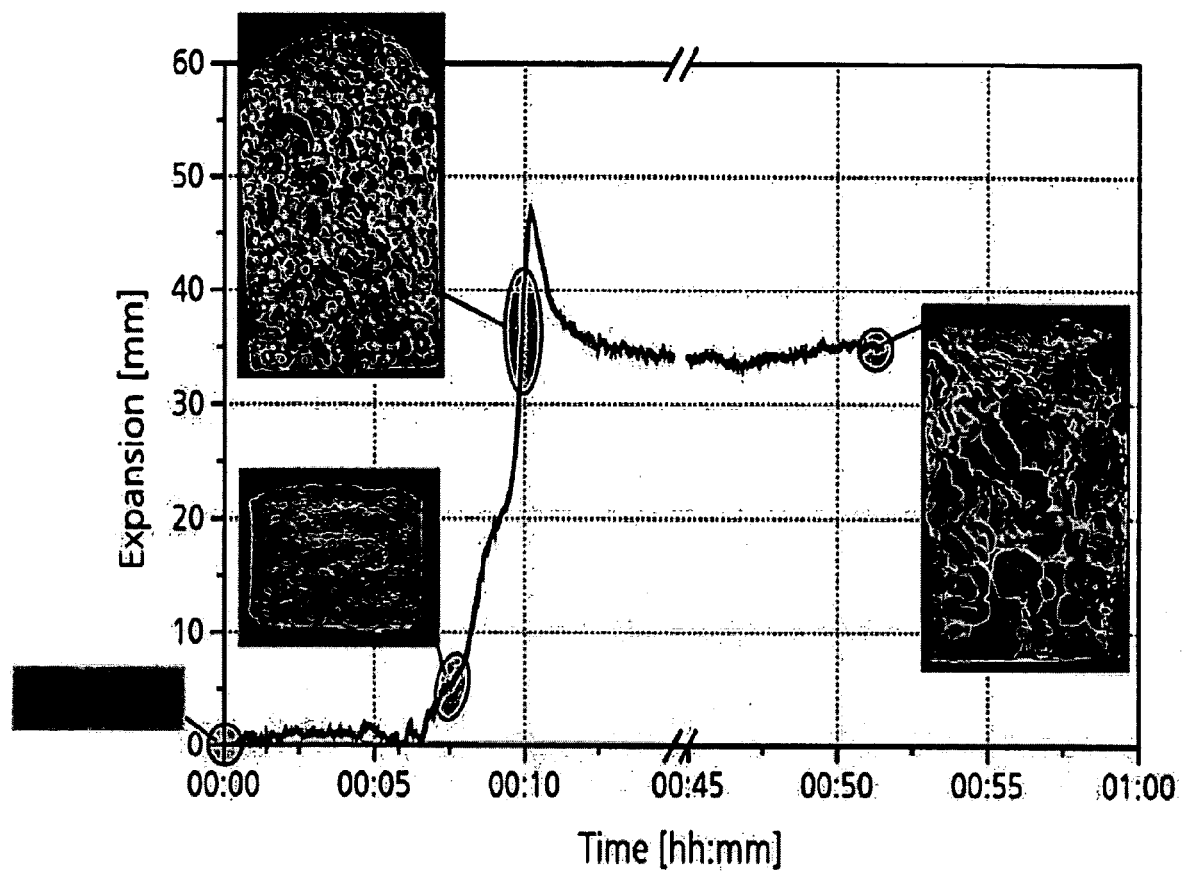
FIG. 1 depicts a graphical representation of the expansion behavior or aluminum/$TiH_2$ compacts when foamed at 750° C. using the prior art powder metallurgy method.
Figure 2:
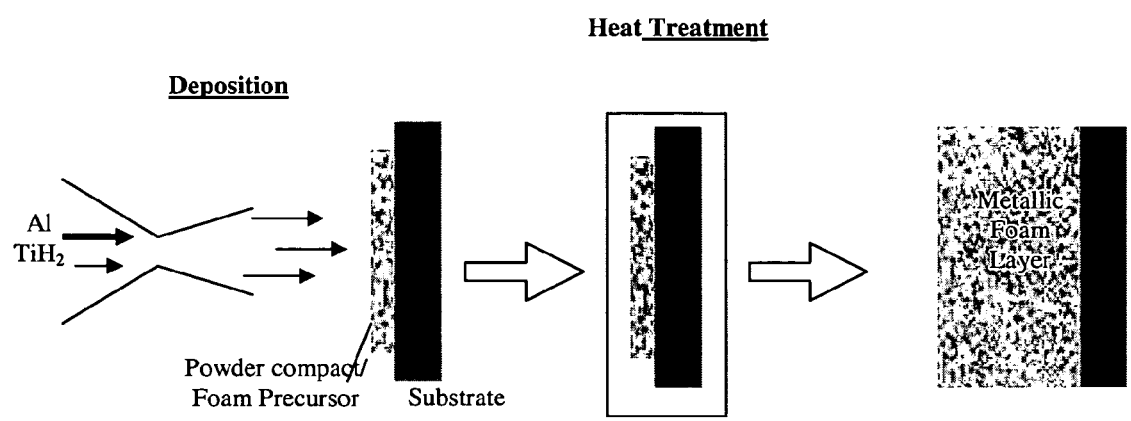
FIG. 2 depicts an illustrative schematic of the process schematic of using the cold spray process to incorporate metallic foams as part of existing structural components.

Although the current industry focus for metal foams is to produce them as self-standing foams, they might find more use if they could be incorporated or joined as part of existing structures. In particular, structures with metallic foam layers may be utilized in the oil, gas, and chemical industry by being an integral part of exploration, refining and chemical process equipment. More particularly, the exploration, refining and chemical process equipment includes, but is not limited to, casings, pipelines, transfer lines and other flow lines. One exemplary, but non limiting embodiment of the metal foam process of the instant invention is shown in FIG. 2. FIG. 2 depicts the concept of depositing the powder metallurgy foam precursor mixture onto the existing structure, then heat treating it to decompose the foaming agent to produce the gas phase and soften the matrix to foam it. The heat treatment could be performed by putting all or part of the structural component in a furnace, or by using the appropriate laser technology to heat only the metal foam precursor layer. In order to deposit the mixture, this would need to be performed at relatively cool temperatures to avoid prematurely decomposing the foaming agent, and possibly avoid any oxidation of the particles or deposited layer. The cold spray process is an exemplary, but non limiting process, for depositing the powder metallurgy mixture onto the substrate.

Cold spray is defined as a coating method for the deposition of powder material onto various substrates. Cold spray is similar to other thermal spray processes in that the acceleration of the particles during transport to the substrate and the impact of the particles to the substrate are important. On the other hand, cold spray differs from the standard thermal spray processes in that the heat transfer from the process gas to the powder is of secondary importance. Using cold spray processing, many metals and some composites at or near room temperature in an ambient air environment may be used as a substrates for deposition. Cold spray is a solid-state process that generally avoids changes in grain size, material chemistry, or phase composition. The resulting deposits typically have low porosity, little or no additional oxide, and compressive residual stresses. There is also minimal heating of the substrate and a greatly reduced need for masking.

Figure 3:
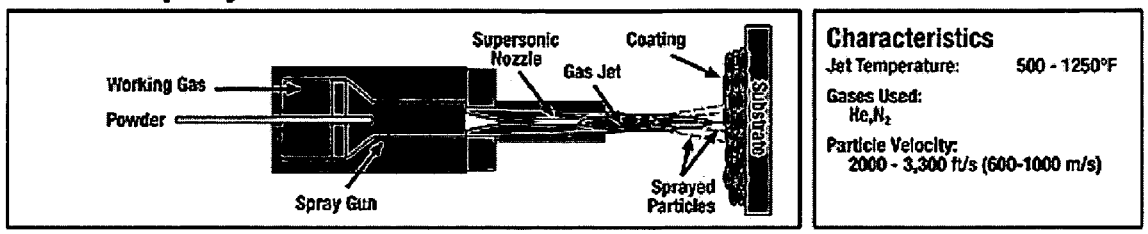
FIG. 3 depicts an illustrative schematic of the cold spray process technique used to form metallic foams of the instant invention.

One exemplary, but non limiting embodiment, of the cold spray process of the instant invention, is shown in FIG. 3. Cold spray is based on the gas-dynamic acceleration of particulates to supersonic velocities (300-1200 m/sec), and hence high kinetic energies, so that solid-state plastic deformation and fusion occur on impact to produce dense coatings without the feedstock material being significantly heated. This is achieved using convergent-divergent, de Laval nozzles, high pressures (up to about 500 psi or about 3.5 MPa) and flow rates (up to about 90 $m^3$/hr) of gases such as helium, nitrogen, and mixtures thereof. The gases may be pre-heated up to approximately 1200 degrees Fahrenheit to increase their velocity. Pre-heating also aids in particle deformation. The spray pattern may range from about 20 to about 60 $mm^2$ (0.031 to 0.093 sq in.) wide; spray rates may range from about 3 to about 5 kg/hr (6.5 to 11 lb/hr) with build-ups of from about 250 µm (10 mils) per pass and deposition efficiencies of about 70 wt %.

Bonding between the metallic foam and the substrate of the instant invention by having sufficient energy to cause significant plastic deformation of the particle and substrate. Under the high impact stresses and stains, interaction of the particle and substrate surfaces may cause disruption of oxide films promoting contact of chemically clean surfaces and high friction generating very high localized heating promoting bonding similar to friction or explosive welding.

The disclosed method of forming a metallic foam layer on a substrate surface provides for the ability to apply foamed metals to numerous substrates. Substrate materials are limited to those that can withstand the aggressive action of the spray particles from the cold spray process. Soft or friable substrates will erode rather than be coated. Exemplary substrates of the instant invention, include, but are not limited to, steel, stainless steel, other ferrous alloys, aluminum, magnesium, copper, titanium and alloys thereof. Ceramic based materials may also serve as suitable substrates.

Feedstock metal particles may range from about 1 to about 50 microns. Exemplary metal particles for use as coating in the instant invention include, but are not limited to, to ductile materials, such as steel, stainless steel, other ferrous alloys, aluminum, magnesium, copper, titanium and alloys thereof. Hard and brittle materials like ceramics cannot be sprayed in the pure form, but may be applied as composites with a ductile matrix phase.

Foaming agents for metal particles of zinc, aluminum, and alloys thereof, include, but are not limited to, titanium hydride ($TiH_2$), and zirconium hydride ($ZrH_2$). Steels may be foamed with, but not limited to, alkaline earth carbonates, such as strontium carbonate ($SrCO_3$). If metal hydrides are used as blowing agents, a content of less than 10%, more preferably less than 3% of the weight of the metal particles, and even more preferably less than 1% is sufficient in most cases.

When the foaming agent, which is homogeneously dispersed within the metal matrix is heated above its decomposition temperature, but below the melting point of the metal material for a sufficient time, gas will be released which will force the unexpanded metallic layer to expand, and thus form a highly porous expanded metal foam layer. The expansion of the metal foam layer may be controlled by the type of foaming agent, the loading level of the foaming agent, the temperature of foam heat treating step, and the time of exposure to the foam heat treating step. The time needed for full expansion depends on temperature and the size of the precursor and may range from a few seconds to several minutes.

The foaming method of the instant invention may also include after the cold spraying step and prior to the foaming heat treating step the additional step of consolidation heat treating the substrate coated with an unexpanded metallic layer to a temperature above the sintering temperature of the unexpanded metallic layer and below the decomposition temperature of the foaming agent. The consolidation heat treating step is for a time sufficient to sinter the unexpanded metallic layer, such that a sintered metallic layer is expanded during the subsequent foam heat treating step to form a sintered expanded metallic layer.

The next step in the method of forming a metallic foam layer on a substrate is to cool the expanded metal foam containing substrate from the foam heat treating step to about ambient temperature. Any suitable cooling means, including, but not limited to, exposure to ambient air, forced air convection, and water cooling may be utilized. The resultant metallic foam layer on a substrate formed by the method of the instant invention may have either an open cell or a closed cell type of structure depending upon a variety of factors, including, but not limited to, the amount of foaming agent. In addition, the metallic foam layer may be either formed as a surface layer of a substrate or as an internal layer of a substrate depending upon the particular application.

The disclosed method of forming a metallic foam layer provides for collapse/buckling resistance, thermal management and mechanical and acoustic damping resistance, and other benefits. The method of forming a metallic foam layer of the instant invention finds application in as an integral part of casings, pipelines, transfer lines, and flow lines. In such applications, the metallic foam layer may be either a surface layer or an internal layer. As an internal layer, the metallic foam layer is between the outer and inner surfaces of the structure. As a surface layer, the metallic foam layer may be the inner surface, the outer surface or both the inner and outer surface of the structure. The method of forming a metallic foam layer of the instant invention also finds application in sand screens, fire barriers and foam-core structural members. In addition, the method finds particular application in the oil, gas, and chemical industry by being an integral part of various onshore, offshore, and related structures, including, but not limited to, use in sand screen, (downhole casing) annular expansion, thermal conductivity/insulation for sub-sea (& other) flowlines, fire barriers for offshore platform living quarters, and light "foam-core" structural members. The method of forming a closed cell metal foam layer of the instant invention also finds application in other industries where the benefits of collapse/buckling resistance, thermal management, and mechanical and acoustic damping resistance are needed.

Test Methods

Volume changes of the metal foam layer were measured by dipping the samples in water, and measuring the weight of the displaced water. The weight of the displaced water was then converted to volume by dividing by the density of water.

Finally, the volume of the foamed layer was calculated by subtracting the measured dimensions of the substrate from the volume of the displaced water.

Optical microscopy and scanning electron microscopy were used for analysis of the foamed metal layer.

EXAMPLES

Figure 4:
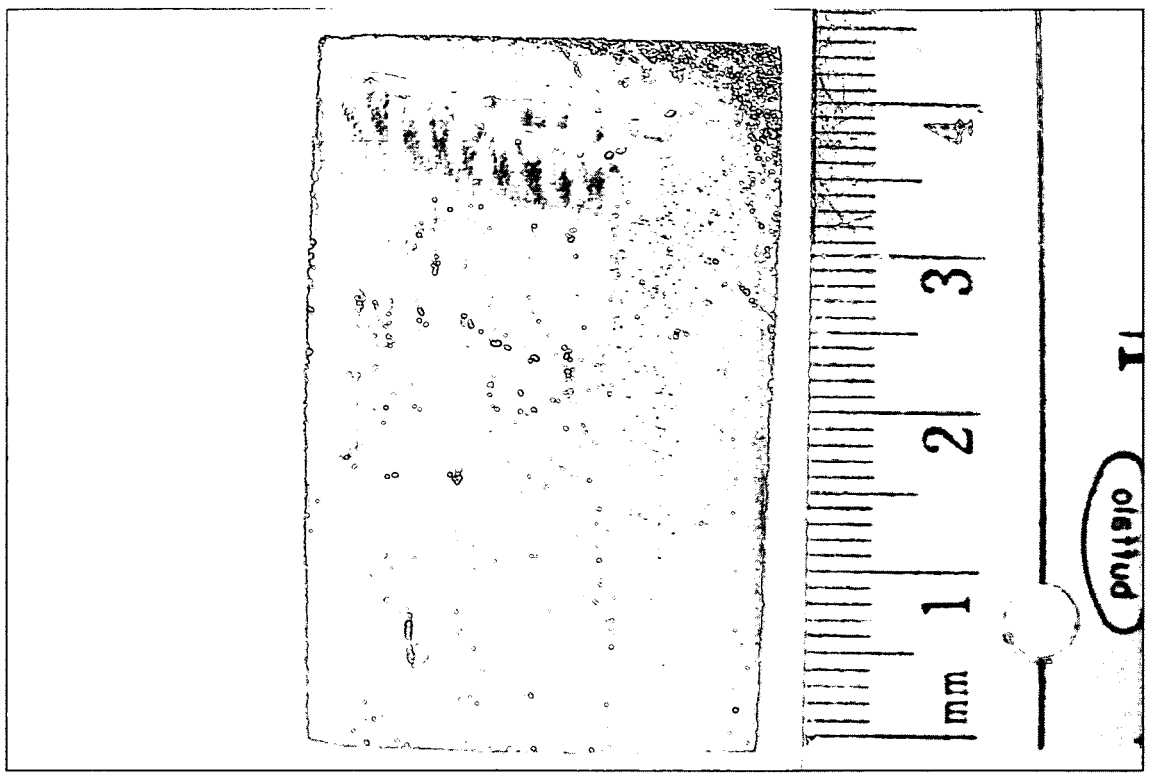
FIG. 4 depicts an illustrative photograph of the top view of an aluminum substrate with an Al-2% $TiH_2$ coating.

In this study, aluminum and $TiH_2$ powders were co-sprayed by the cold spray technique as a coating on an aluminum surface. The coating was subsequently heated to decompose the $TiH_2$ particles to elemental titanium and gaseous hydrogen. The hydrogen gas creates the pores to form the foam. In one experiment, cold spray processing was used to apply a foam precursor layer ($TiH_2$) onto a 5 mm aluminum substrate as depicted in FIG. 4. The powders used in the foam precursor layer were approximately 25 μm in diameter. They were mixed in the appropriate ratios and transported with nitrogen as the carrier gas at different temperatures in order to make the following two specimens:

Specimen 1—Al-2.0% $TiH_2$, sprayed at 600° F. onto a 5 mm Al substrate.

Specimen 2—Al-0.2% $TiH_2$, sprayed at 700° F. onto a 5 mm Al substrate.

These specimens were then cut to produce samples that were 7 mm×7 mm with a foam precursor layer height that would vary depending on where the sample had been cut.

An initial concern was whether the cold spray precursor layer would require a consolidation heat treatment to minimize short-circuiting of the foaming process. The consolidation heat treatment would be sufficiently high to sinter, but below the hydride decomposition temperature. Experiments were designed both with and without the consolidation heat treatment prior to the foaming heat treatment. A box furnace was used to perform the thermal cycles. Each sample was placed with a ceramic crucible with a cover, and argon was pumped inside the ceramic housing at rate of about 100 ml/min.

Figure 5:
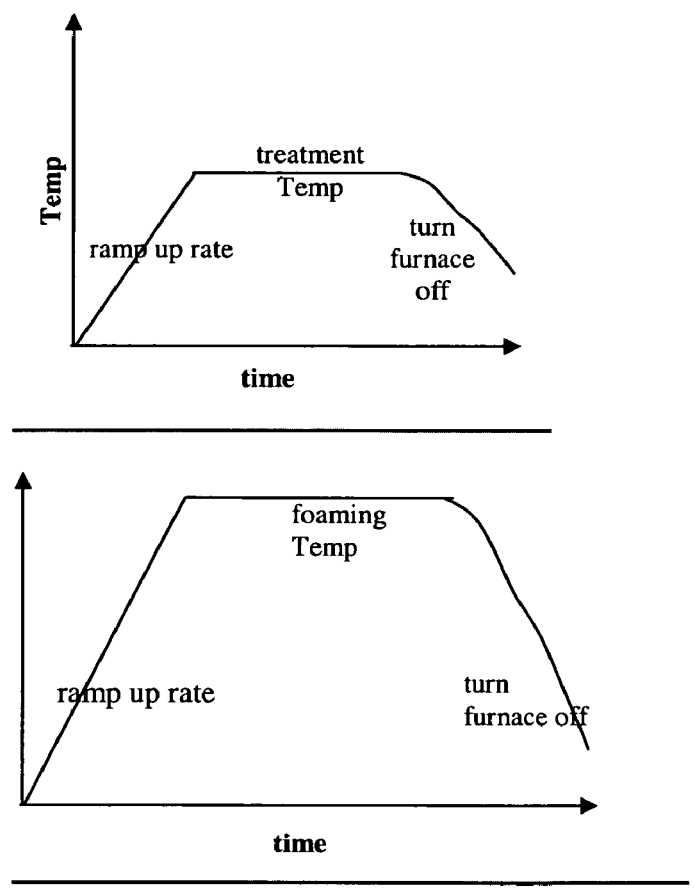
FIG. 5 depicts illustrative graphs of consolidation and foaming thermal cycles.
Figure 6:
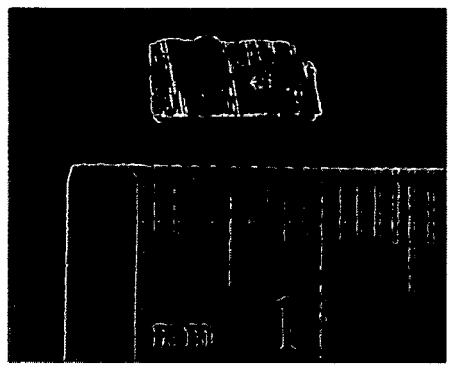
FIG. 6 depicts illustrative photographs of an Al-2% $TiH_2$ coated sample prior to and after heat treatment.
Figure 6:
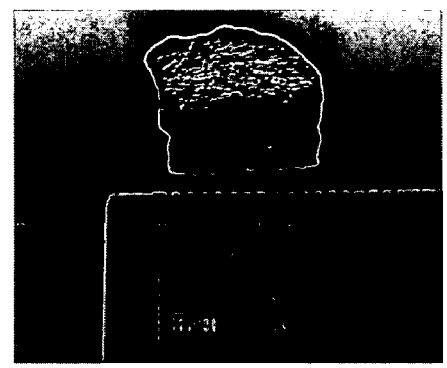

The complete list of thermal treatments for the 2.0% and 0.2% Al-$TiH_2$ foam precursor samples are depicted in Table 1 and Table 2, respectively. Both thermal cycles were performed separately, and a graphical illustration of these cycles is depicted in FIG. 5.

TABLE 1

Thermal cycle for specimens made from Al—2%$TiH_2$ coated sample.

| Sample # | Consolidation Treatment | | | Foaming Treatment | | |
|---|---|---|---|---|---|---|
| | ΔT, C./min | Temp, C. | time, min | ΔT, C./min | Temp, C. | time, min |
| 1 | 50 | 400 | 60 | 70 | 750 | 12 |
| 2 | 50 | 500 | 60 | 180 | 750 | 12 |
| 3 | 50 | 500 | 30 | 180 | 725 | 12 |
| 4 | 50 | 400 | 30 | 70 | 700 | 10 |
| 5 | none | | | 70 | 750 | 12 |
| 6 | none | | | 180 | 750 | 12 |

TABLE 2

Thermal cycle for specimens made from Al—0.2%$TiH_2$ coated sample.

| Sample # | Consolidation Treatment | | | Foaming Treatment | | |
|---|---|---|---|---|---|---|
| | ΔT, C./min | Temp, C. | time, min | ΔT, C./min | Temp, C. | time, min |
| 1 | none | | | 180 | 750 | 15 |
| 2 | none | | | 180 | 700 | 15 |
| 3 | none | | | 180 | 725 | 15 |
| 4 | none | | | 180 | 750 | 5 |
| 5 | none | | | 180 | 725 | 20 |
| 6 | none | | | 100 | 750 | 15 |
| 7 | 180 | 380 | 60 | 180 | 725 | 15 |
| 8 | 180 | 380 | 60 | 180 | 725 | 10 |
| 9 | 180 | 380 | 60 | 180 | 750 | 10 |
| 10 | 180 | 380 | 30 | 100 | 750 | 15 |

The samples in Table 1 and 2 were also measured for volume change of the coating to determine the degree of foaming or porosity of the coating. Table 3 depicts the % volume change of a Al-2% $TiH_2$ coating on an aluminum substrate as a function of thermal treatment. The data indicates that volume changes of up to about 345% are achievable with the foaming method of the instant invention for an aluminum coating expanded with 2% $TiH_2$.

TABLE 3

% VOLUME CHANGE MEASURED FOR SPECIMENS COATED WITH AL—2%$TIH_2$

| | Coating Approx Vol Change | | | |
|---|---|---|---|---|
| Sample ID | Initial Vol, cm³ | Final Vol, mm³ | % Change | Notes |
| 1 | 0.0887 | 0.3977 | 348% | |
| 2 | 0.1727 | 0.1979 | 15% | |
| 3 | 0.1464 | 0.3307 | 126% | Coating appears to have fallen/slipped on 1 side |
| 4 | 0.1342 | 0.1524 | 14% | |
| 5 | 0.1440 | 0.4730 | 228% | Archimedes method minus est of meas base vol |
| 6 | 0.1411 | 0.2644 | 87% | Archimedes method minus est of meas base vol |

Table 4 depicts the % volume change of a Al-0.2% $TiH_2$ coating on an aluminum substrate as a function of thermal treatment. The data indicates that volume changes of up to about 120% are achievable with the method of the instant invention for an aluminum coating expanded with 0.2% $TiH_2$. Hence, a lower loading of the foaming agent ($TiH_2$) results in less expansion of the aluminum coating during the foam heat treating step.

TABLE 4

% Volume change measured for specimens coated with Al—0.2%$TiH_2$

| | Coating Approx Vol Change | | | |
|---|---|---|---|---|
| Sample # | Initial Vol, cm³ | Final Vol, mm³ | % Change | Notes |
| 1 | 0.1602 | 0.2957 | 85% | |
| 2 | 0.1538 | 0.2665 | 73% | |
| 3 | 0.2912 | 0.5660 | 94% | |
| 4 | 0.2410 | 0.5348 | 122% | |
| 5 | 0.1433 | 0.2170 | 51% | |
| 6 | 0.1953 | 0.3580 | 83% | |

TABLE 4-continued

% Volume change measured for specimens coated with Al—0.2%TiH$_2$

Coating Approx Vol Change

| Sample # | Initial Vol, cm$^3$ | Final Vol, mm$^3$ | % Change | Notes |
|---|---|---|---|---|
| 7 | 0.2330 | 0.4324 | 86% | |
| 8 | 0.1558 | 0.1558 | 0% | min coating on this sample |
| 9 | 0.1788 | 0.3160 | 77% | |
| 10 | 0.2292 | 0.4245 | 85% | |

Figure 7:
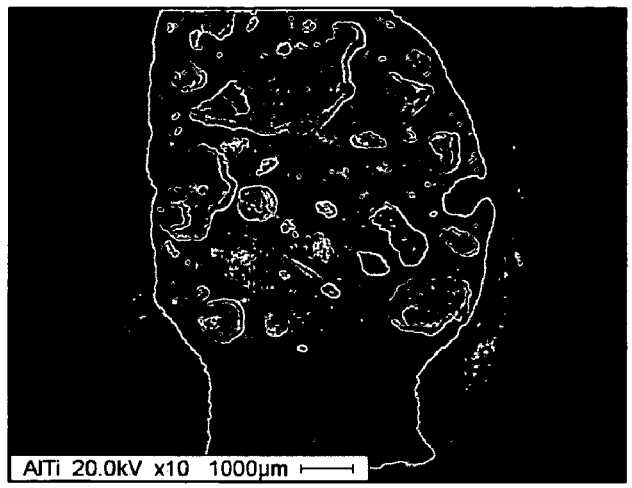
FIG. 7 depicts illustrative optical micrographs of the Al-2% $TiH_2$ of Sample #1 at three different magnification levels (10×, 100×, and 500×).
Figure 7:
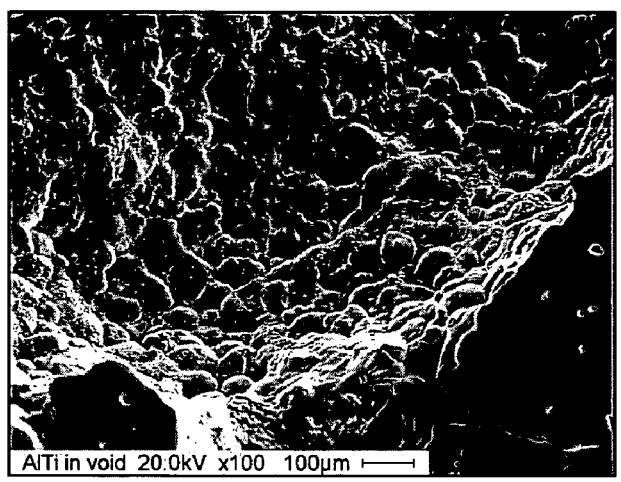
Figure 7:
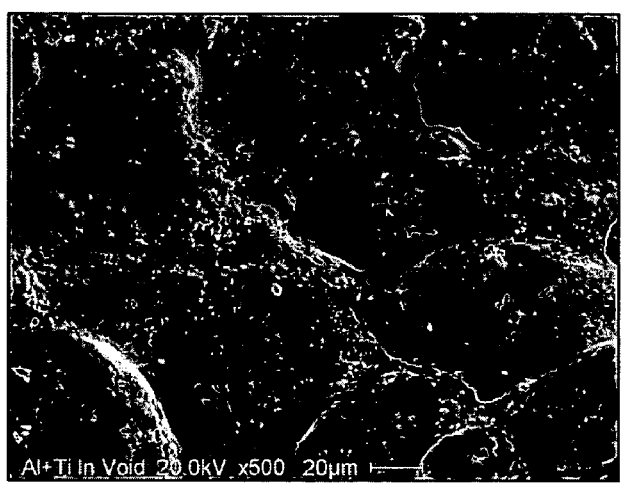
Figure 8:
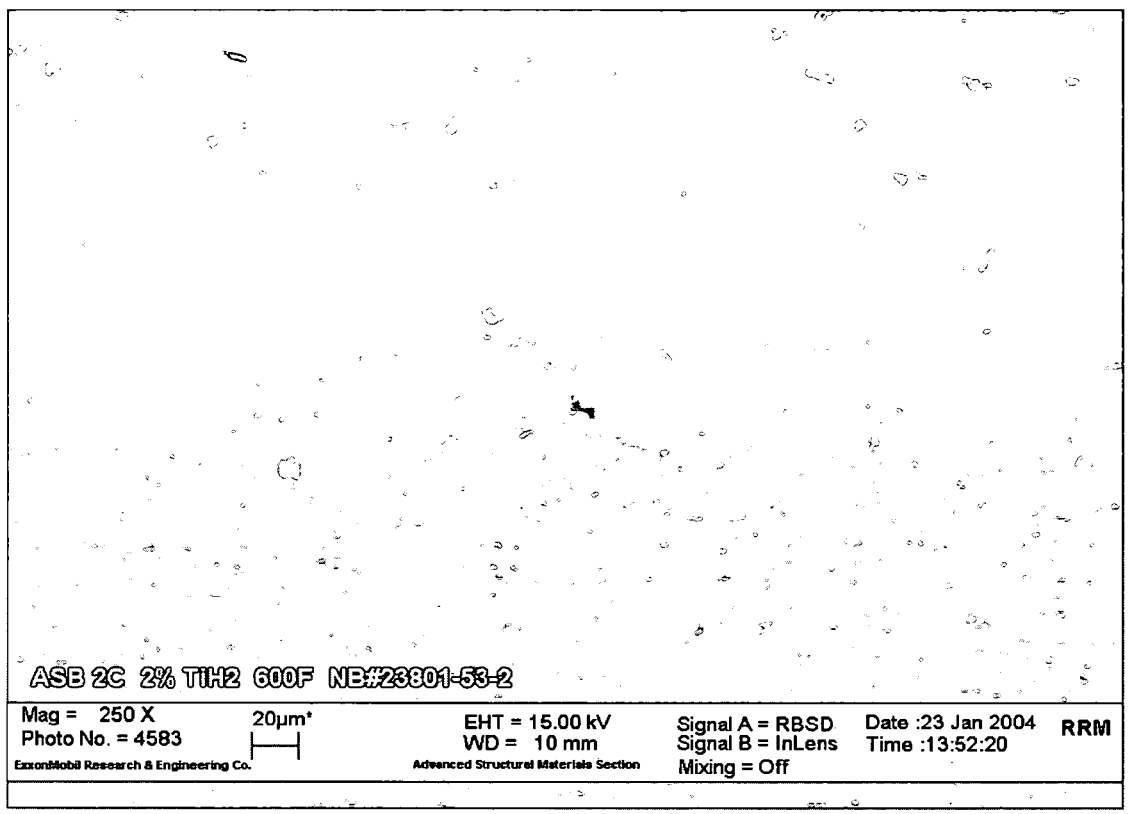
FIG. 8 is an illustrative scanning electron micrograph of an unexpanded Al-2% Ti $H_2$ cold-sprayed coated sample taken near the interface of the coating at 250× magnification.
Figure 9:
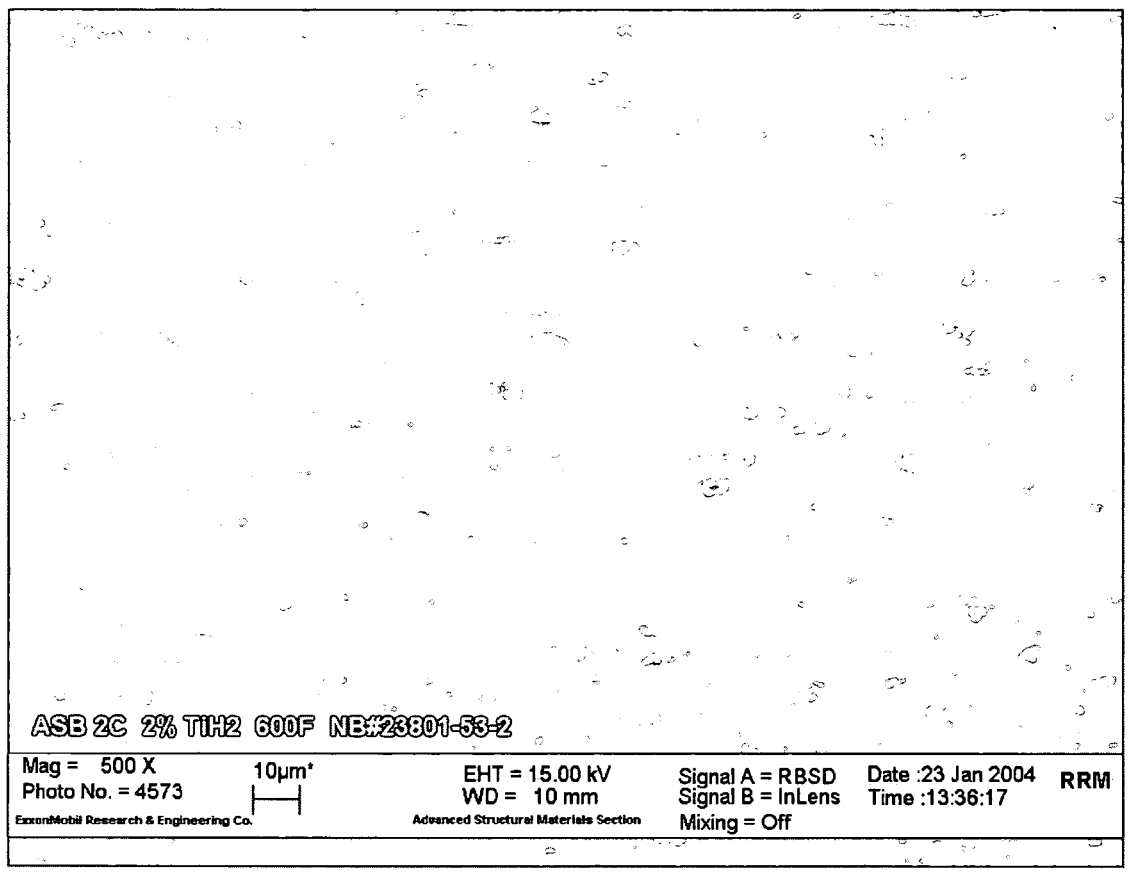
FIG. 9 is another illustrative scanning electron micrograph of an unexpanded Al-2% $TiH_2$ cold-sprayed coated sample taken near the interface of the coating at 500× magnification.
Figure 10:
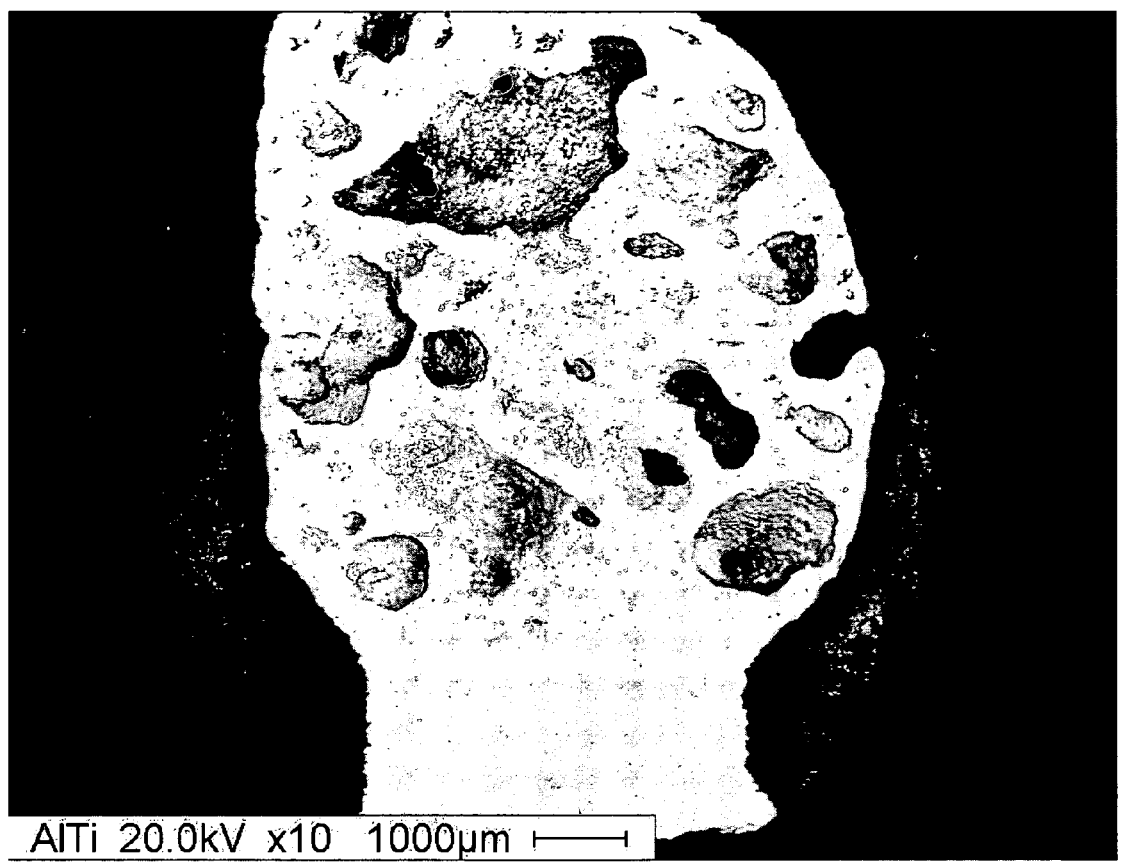
FIG. 10 is an illustrative scanning electron micrograph of a cross-section of an expanded Al-2% $TiH_2$ cold-sprayed coated sample (sample #1) at 10× magnification.
Figure 11:
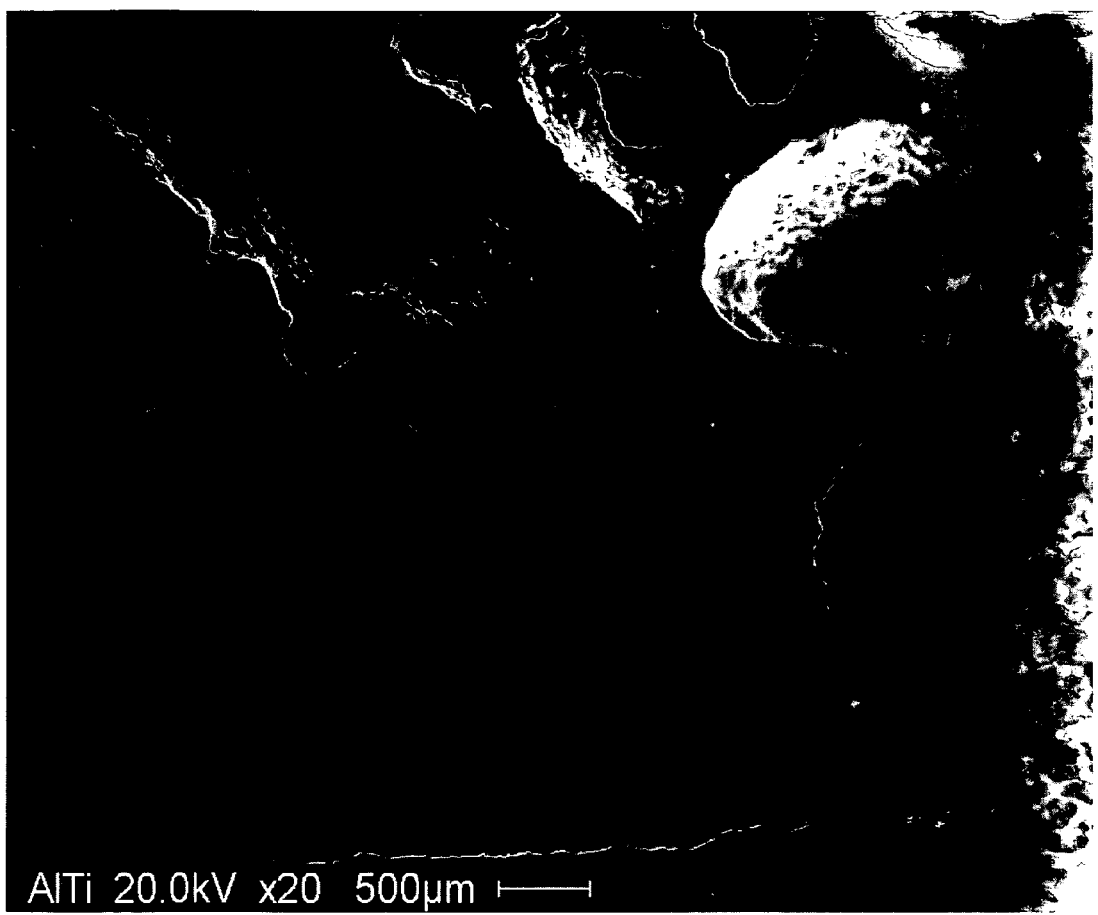
FIG. 11 is an illustrative scanning electron micrograph of a cross-section of an expanded Al-2% $TiH_2$ cold-sprayed coated sample (sample #1) at 20× magnification.
Figure 12:
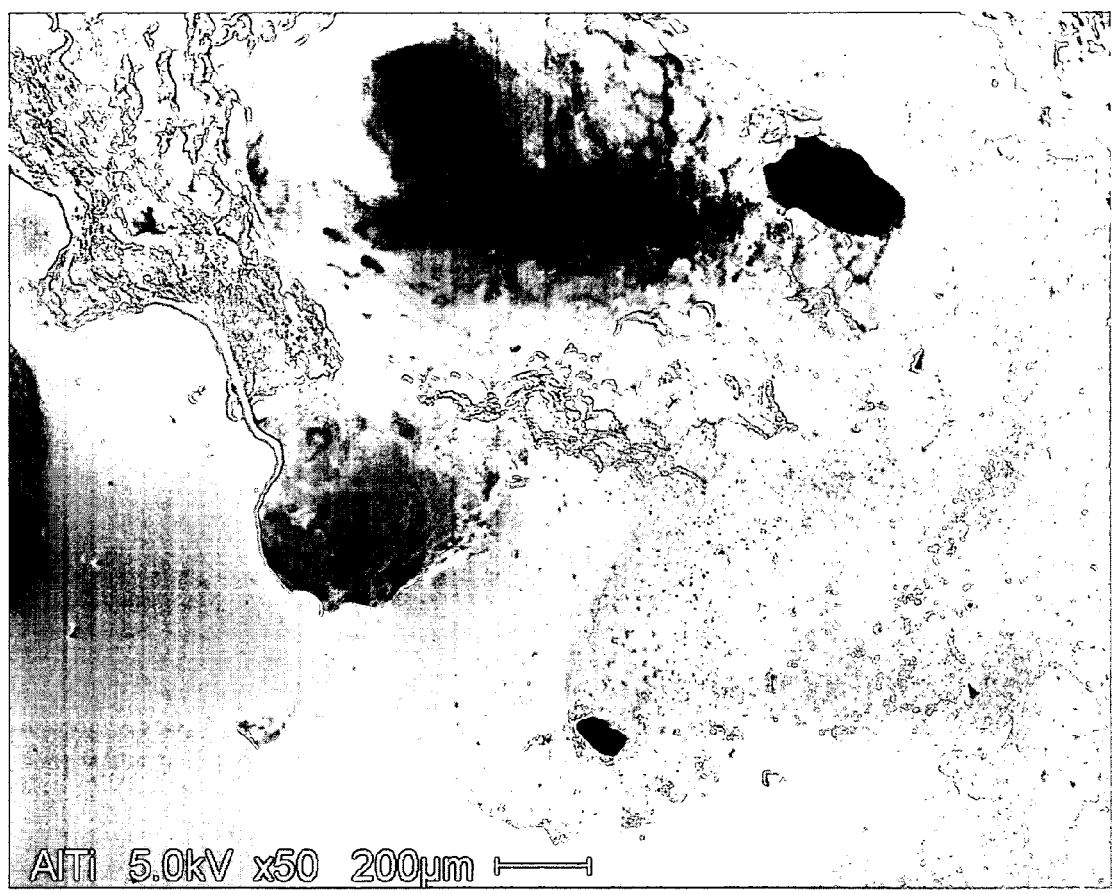
FIG. 12 is an illustrative scanning electron micrograph of a cross-section of an expanded Al-2% $TiH_2$ cold-sprayed coated sample (sample #1) at 50× magnification.
Figure 13:
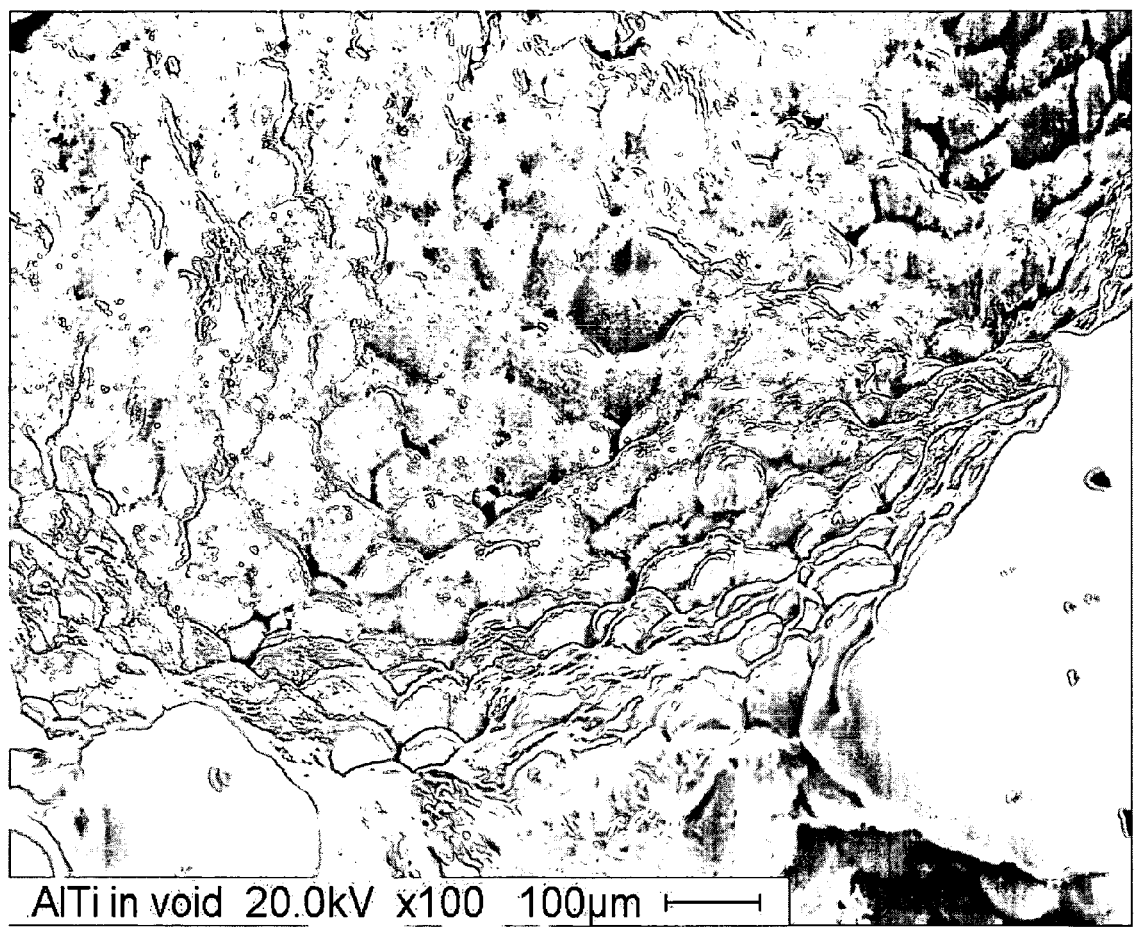
FIG. 13 is an illustrative scanning electron micrograph of a cross-section of an expanded Al-2% $TiH_2$ cold-sprayed coated sample (sample #1) at 100× magnification.
Figure 14:
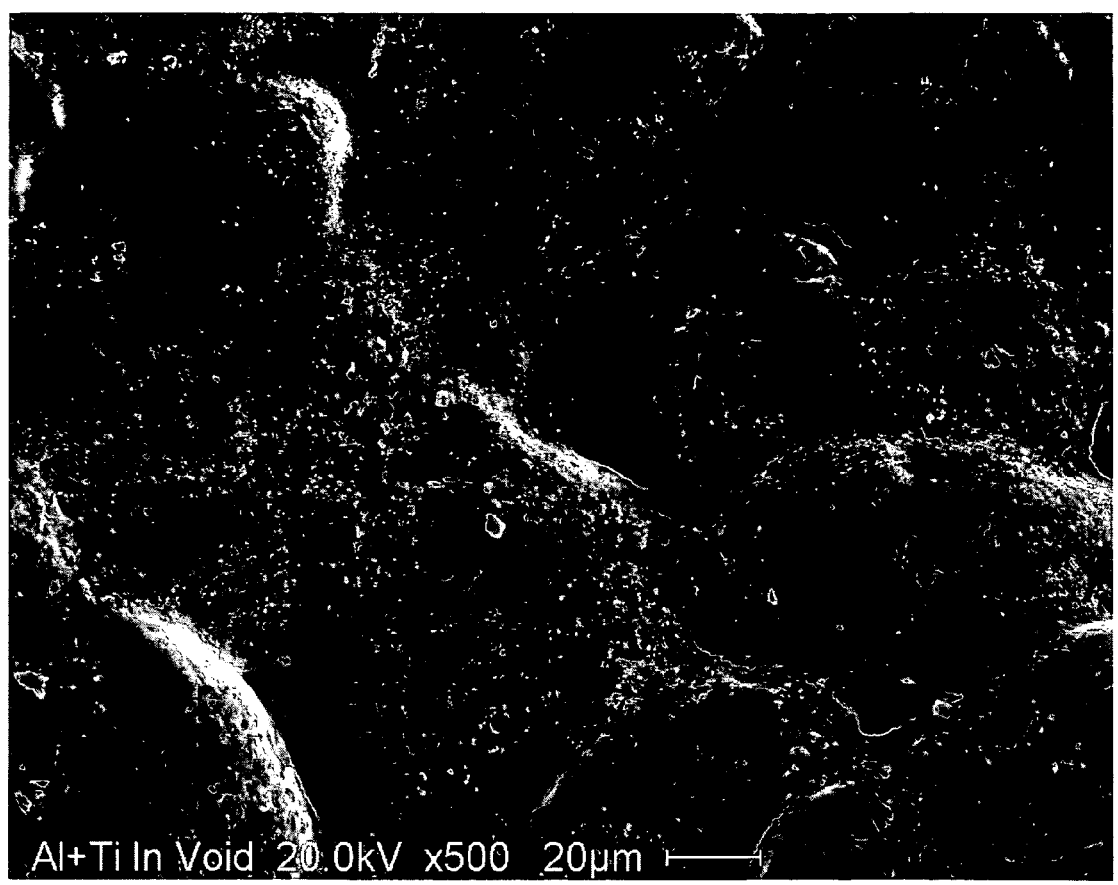
FIG. 14 is an illustrative scanning electron micrograph of a cross-section of an expanded Al-2% $TiH_2$ cold-sprayed coated sample (sample #1) at 500× magnification.
Figure 15:
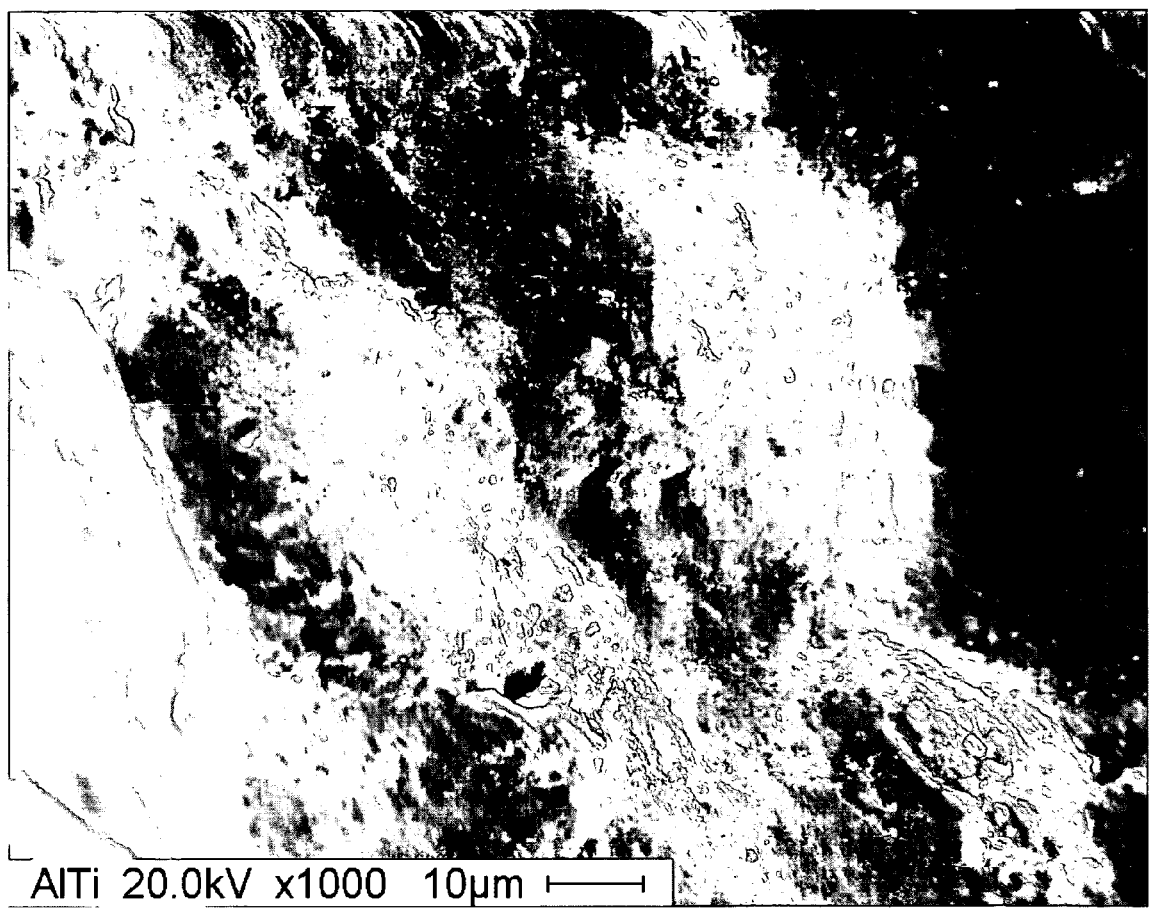
FIG. 15 is an illustrative scanning electron micrograph of a cross-section of an expanded Al-2% $TiH_2$ cold-sprayed coated sample (sample #1) at 1000× magnification.

Optical microscopy and scanning electron microscopy (SEM) were utilized to characterize the morphology of unexpanded and expanded samples of aluminum coated with 2% TiH$_2$. FIG. 7 depicts illustrative optical micrographs of the Al-2% TiH$_2$ of Sample #1 at three different magnification levels (10×, 100×, and 500×), and confirms the presence of a closed cell foam type morphology of the aluminum coating. FIGS. 8 and 9 are illustrative scanning electron micrographs of an unexpanded Al-2% Ti H$_2$ cold-sprayed coated sample taken near the interface of the coating at 250× and 500× respectively. These figures confirm the lack of foaming prior to the foaming treatment step. FIGS. 10, 11, 12, 13, 14, and 15 are illustrative scanning electron micrographs of the cross-section of an expanded Al-2% TiH$_2$ cold-sprayed coated sample #1 at 10×, 20×, 50×, 100×, 500× and 100× respectively. These figures confirm the closed cell aluminum foamed structure produced by the coating method of the instant invention. The results of the study demonstrate that metal foams can be formed on a solid metal surface by the cold spray method, and that the size and distribution of pores may be altered as a function of processing conditions.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

What is claimed is:

1. A method of forming a metallic foam layer on a substrate comprising the following steps:
   providing a substrate for coating of a metallic foam;
   cold spraying a mixture of metal particles and a foaming agent onto said substrate to form a substrate coated with an unexpanded metallic layer;
   foam heat treating said substrate coated with an unexpanded metallic layer at a temperature above the decomposition temperature of said foaming agent for a time sufficient to form a heated substrate coated with an expanded metal foam layer; and
   cooling said heated substrate coated with an expanded metal foam layer to about ambient temperature to form a cooled substrate coated with an expanded metal foam layer,
   wherein said cooled substrate coated with an expanded metal foam layer comprises an integral part of downhole casings, pipelines, transfer lines, and flow lines used in oil and gas exploration, refinery and chemical process equipment for improved thermal management, mechanical damping resistance and fire barrier protection.

2. The method of claim 1, wherein said expanded metal foam layer is of a closed cell or an open cell structure.

3. The method of claim 1, wherein said substrate is selected from the group consisting of aluminum, steel, stainless steel, copper, titanium, magnesium, and alloys thereof.

4. The method of claim 1, wherein said substrate is a ceramic based material.

5. The method of claim 1, wherein said metal particles are selected from the group consisting of aluminum, steel, stainless steel, copper, titanium, magnesium, and alloys thereof.

6. The method of claim 5, wherein said metal particles have a particle size of from about 1 to about 50 microns.

7. The method of claim 1, wherein said foaming agent is a metal hydride or an alkaline earth carbonate.

8. The method of claim 7, wherein said foaming agent is titanium hydride, or zirconium hydride.

9. The method of claim 1, wherein said foaming agent comprises less than about 10% of said mixture of metal particles and a foaming agent.

10. The method of claim 9, wherein said foaming agent comprises less than about 3% of said mixture of metal particles and a foaming agent.

11. The method of claim 1, wherein said cold spraying step further comprises the following steps:
   providing a cold spray gun having a supersonic nozzle with i) said mixture of metal particles and a foaming agent, and ii) a preheated working gas to form a gas mixture, wherein said preheated working gas is selected from the group consisting of helium, nitrogen and mixtures thereof;
   accelerating with said cold spray gun through said supersonic nozzle said gas mixture to form a spray pattern of an accelerated gas mixture, wherein the velocity of said accelerated gas mixture is from about 300 to about 1200 meters/sec; and
   depositing said metal particles and said foaming agent in said accelerated gas mixture onto said substrate to form an unexpanded layer of said mixture of metal particles and foaming agent.

12. The method of claim 11, wherein said supersonic nozzle is of the convergent-divergent type.

13. The method of claim 11, wherein said preheated working gas is at a temperature of from about 200° to about 1200° F.

14. The method of claim 11, wherein said cold spray step is carried out at about ambient temperature.

15. The method of claim 11, wherein said spray pattern is from about 0.031 to about 0.093 sq in. wide having a spray rate of from about 6.5 to about 11.0 lb/hr with a build-up rate of about 10 mils per pass.

16. The method of claim 1, wherein said foaming heat treating step is carried out in a furnace or by a laser.

17. The method of claim 1 further comprising after said spraying step and prior to said foaming heat treating step the following step:
   consolidation heat treating said substrate coated with an unexpanded metallic layer to a temperature above the sintering temperature of said unexpanded metallic layer and below the decomposition temperature of said foaming agent for a time sufficient to sinter said unexpanded metallic layer.

18. The method of claim 1 wherein said cooled substrate coated with an expanded metal foam layer comprises one or more surface layers.

19. A method of forming a metallic foam layer on a substrate comprising the following steps:
- providing a ferrous substrate for coating of a metallic foam;
- cold spraying a mixture of ferrous particles and an alkaline earth carbonate foaming agent onto said substrate to form a ferrous substrate coated with an unexpanded ferrous layer;
- foam heat treating said ferrous substrate coated with an unexpanded ferrous layer at a temperature above the decomposition temperature of said alkaline earth carbonate foaming agent for a time sufficient to form a heated ferrous substrate coated with an expanded ferrous foam layer; and
- cooling said heated ferrous substrate coated with an expanded ferrous foam layer to about ambient temperature to form a cooled ferrous substrate coated with an expanded ferrous foam layer,
- wherein said cooled substrate coated with an expanded metal foam layer comprises an integral part of downhole casings, pipelines, transfer lines, and flow lines used in oil and gas exploration, refinery and chemical process equipment for improved thermal management, mechanical damping resistance and fire barrier protection.

20. The method of claim 19, wherein said expanded ferrous foam layer is of a closed cell or an open cell structure.

21. The method of claim 19, wherein said ferrous substrate is steel or stainless steel.

22. The method of claim 19, wherein said ferrous particles are steel or stainless steel.

23. The method of claim 19, wherein said alkaline earth carbonate foaming agent is strontium carbonate.

24. The method of claim 19, wherein said alkaline earth carbonate foaming agent comprises less than about 10% of said mixture of ferrous particles and an alkaline earth carbonate foaming agent.

25. The method of claim 24, wherein said alkaline earth carbonate foaming agent comprises less than 3.0% of said mixture of ferrous particles and an alkaline earth carbonate foaming agent.

26. The method of claim 19, wherein said cold spraying step further comprises the following steps:
- providing a cold spray gun having a supersonic nozzle with said mixture of ferrous particles and an alkaline earth carbonate foaming agent and a preheated working gas to form a gas mixture, wherein said preheated working gas is helium, or nitrogen;
- accelerating with said cold spray gun through said supersonic nozzle said gas mixture to form a spray pattern of an accelerated gas mixture, wherein the velocity of said accelerated gas mixture is from about 300 to about 1200 meters/sec; and
- depositing said ferrous particles and said alkaline earth carbonate foaming agent in said accelerated gas mixture onto said ferrous substrate to form an unexpanded layer of said mixture of ferrous particles and an alkaline earth carbonate foaming agent.

27. The method of claim 26 further comprising after said spraying step and prior to said foaming heat treating step the following step:
- consolidation heat treating said ferrous substrate coated with an unexpanded ferrous layer to a temperature above the sintering temperature of said unexpanded ferrous layer and below the decomposition temperature of said foaming agent for a time sufficient to sinter said unexpanded ferrous layer.

28. The method of claim 19, wherein said cooled substrate coated with an expanded ferrous foam layer comprises one or more surface layers.

* * * * *